2 Sheets—Sheet 1.

J. A. OSENBRÜCK.

LUBRICATOR.

No. 6,794. Reissued Dec. 14, 1875.

WITNESSES.

Wm. Garner

Frank M. Burnham

INVENTOR.

J. A. Osenbrück per

F. A. Lehmann, Atty.

2 Sheets—Sheet 2

J. A. OSENBRÜCK.

LUBRICATOR.

No. 6.794. Reissued Dec. 14, 1875.

WITNESSES.

J. Wm. Garner

F. H. Burnham

INVENTOR

J. A. Osenbrück per

F. A. Lehmann, Atty.

UNITED STATES PATENT OFFICE.

JOHANNES A. OSENBRÜCK, OF HEMELINGEN, GERMANY.

IMPROVEMENT IN LUBRICATORS.

Specification forming part of Letters Patent No. 138,274, dated April 29, 1873; reissue No. 6,794, dated December 14, 1875; application filed November 15, 1875.

*To all whom it may concern:*

Be it known that I, JOHANNES AUGUST OSENBRÜCK, of Hemelingen, in the Kingdom of Prussia, Germany, have invented certain new and useful Improvements in Lubricators; and I do hereby declare that the following is a full, clear, and exact description thereof, that will enable others skilled in the art to which it appertains to make and use the same, reference being had to the accompanying drawings, and to the letters of reference marked thereon, which form a part of this specification.

My invention relates to an improvement in lubricators for bearings of quickly-rotating shafts of all kinds, such as circular saws, wood-planing machines, car-axles, blowers, ventilators, &c., as well as for swiftly-rotating movable or loose pulleys and similar objects.

The principal upon which my invention works is centrifugal power. To each bearing to be lubricated by means of my invention there is applied a circular cup, made of cast or wrought iron, glass, or any suitable material, which cup is secured to, and revolves with, the shaft. Attached to the bearing, at the end to which the cup is applied, is a small pipe, which is so bent as to extend up into the cup so as to almost touch its interior surface, the outer end of the said pipe being open and crooked so as to extend in the opposite direction to which the shaft revolves. When the shaft is made to revolve, all the lubricating compound that is contained in the revolving cup is thrown, by centrifugal power, out against its interior surface, and as the cup revolves around the stationary pipe the compound is forced into the open crooked end of the said pipe with a power that is in exact ratio to the speed at which the shaft is made to revolve. The compound passes through the pipe, and a connecting-passage that leads to a fixed lubricating-chamber that is secured to the bearing; and from this chamber the compound runs down upon the axle, lubricates it, and then passes back into the cup again, and thus on around, keeping up a constant circulation from one end of the bearing to the other, so as to lubricate all parts alike.

Figure 1:
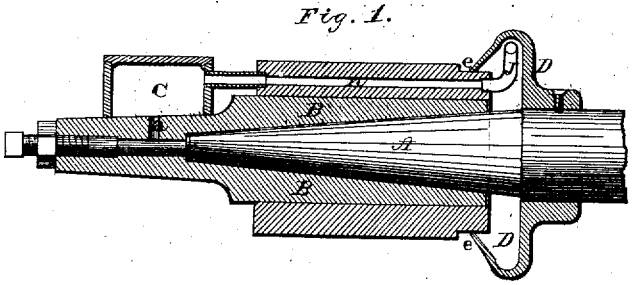
Figure 2:
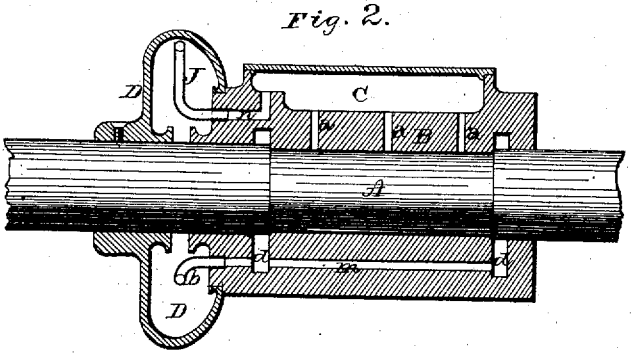
Figure 3:
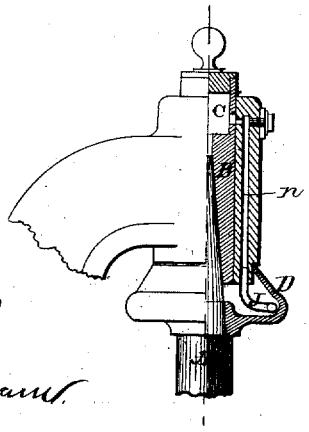
Figure 4:
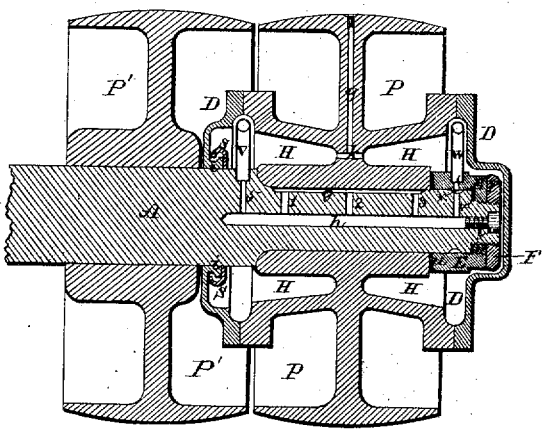
Figure 5:
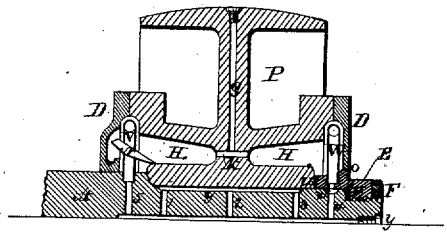

Figures 1, 2, 3 of the drawings represent my invention as applied to the bearings of both vertical and horizontal shafts, and Figs. 4 and 5 as applied to loose pulleys.

In Fig. 1, A represents a shaft, B its bearings, and C a box that is secured to, or formed with, the bearing, and which has a hole, *a*, through its bottom, so as to let the oil, grease, or other compound run down to or upon the shaft, so as to lubricate it. Rigidly secured to the shaft, so as to revolve with it, is a cup, D, of the form here shown, or any other that may be preferred, which has its inner end made to fit snugly over the round end *e* of the bearing B, so as to prevent any leakage of the lubricator from the cup at this point. Secured to the inner end of the bearing B, so as to extend up into the cup D, is a suitable pipe, J, the upper end of which almost touches the inner circumference of the cup. This upper end is open, and bent or crooked so as to extend in the opposite direction to which the cup turns. As the shaft begins to revolve the oil or grease runs down through the hole *a*, lubricates the shaft A, and finds its way down into the cup D. As the cup revolves this oil or grease is thrown outward, by centrifugal force, against its inner surface, and as it is being carried around by the cup it is caught by the open end of the pipe J, into which it is forced with a power that is in direct ratio to the speed of the shaft. As the oil or grease is forced into this pipe it runs through the passage *n* and pipe *n'*, that connects the box C and bearing together, into the box C, from where it first started. Thus it will be seen that the oil or grease is kept circulating back and forth through the bearing, and in exact proportion as it is needed. When the shaft is revolving slowly there is but a small amount of oil or grease required to lubricate it, but when revolving rapidly a much greater quantity is necessary; and it is to regulate this uneven quantity that my invention is intended.

In Fig. 2, A represents the shaft; B, its bearing; C, the oil or grease box formed in its top, and having the passages *a*, to let the oil or grease run down on the shaft. Secured to the shaft is the cup D, and extending up into this cup, as already described, is the pipe J, through which is forced the oil or grease, back into the box C by way of the passage *n*. The oil or grease, after running down on the shaft, is carried along in both directions until it reaches the two narrow chambers *d*, into which it runs, and from which chambers it returns to the cup, through the passage *m* and pipe *b*, to be again sent through the bearing in proportion to the rate of speed of the shaft. Where the shaft is straight the chambers *d*, passage *m*, and pipe *b* may be used, so as to make the circulation complete; but where the shaft is made tapering, as shown in Fig. 1, they are not necessary. In all instances the cup D has its inner edge made to fit over the end of the bearing B in such a manner as to prevent any waste of the oil or grease at this point.

In Fig. 3 is shown one end of a vertical shaft, A, revolving in its bearing B. In the upper part of the bearing is formed the oil or grease box C, and to the lower end of the bearing is attached the pipe J, which extends out into the cup D. The oil or grease runs down through the passage *a* from the box C along the shaft into the cup D, and by the revolution of the shaft and cup it is forced, through the pipe J and passage *n*, back into the box again.

In Fig. 5 my invention is shown as applied to loose pulleys, and in which A represents the shaft, which is turned so as to be much smaller at its end, where the loose pulley P is fastened on by the screw-nut E and lock-nut F, than where the fixed pulley P′ is secured. In the end of this shaft is made a hole, *h*, of suitable size, that extends back of the loose pulley, and which has its outer end closed by the screw-plug *y*. Extending outward from this hole *h* are a number of passages, 1 2 3, that communicate with a longitudinal groove, *g′*, made in the shaft, and into which the oil or grease runs for the purpose of lubricating the pulley. Between the outer end of the pulley and a shoulder on the shaft, and the inner end and shoulder of the nut E, are placed suitable washers *u*, for the purpose of making tight joints at these places. Secured to each side of the loose pulley P is a cup, D, as already described, out into which extend the crooked pipes V W, the pipe V being fastened directly to the shaft, and communicating with the hole *h* through the passage 5, while the pipe W is fastened to the nut E, and communicates with the groove *x*, cut in the periphery of the shaft A, and with the hole *h*, through the passage 4. In the loose pulley there are made two chambers, H, which communicate by the passage *k*, and are filled through the hole *g*, which hole *g* has its outer end stopped by a screw-plug. The cup D, that is secured to the inner side of the pulley, has a flange, *i*, turned up above the shaft on its inner side, and over this flange catches or bends a curved disk, *s*, fast on the shaft.

The oil having been poured into the chambers H, it is thrown outward, by centrifugal force, against the inner sides of the cups D, from whence it is taken by the pipes V W, and forced into the hole *h*, and from thence, after lubricating the pulley, back into the chambers H.

In this figure one of the oil-cups is shown as covering the entire end of the shaft and the nuts that hold the pulley in position.

In Fig. V is shown a single loose pulley by itself, in which the parts are arranged as shown in Fig. 4, with the exception of the cup D at the end of the shaft, and the substitution of a collar, N, in the inner cup for the disk *s*. In the present instance, and whenever the pulley is placed at any distance from the end of the shaft, the inner edge is made to fit down on the nut E, as at *o*, so as to form a tight joint at this place and prevent the leakage of the oil. In the inner cup is placed a collar, N, inclined toward the inner side, and laid around the lubricating-tube V, which conveys the oil scattered toward the inside into the chamber H.

This method of lubrication may be used so as to lubricate all the bearings from a single revolving cup by placing such a cup on a swiftly-rotating axle that is driven from the main shaft. The rotation of this cup will force the oil or grease into a box that is placed above the level of all the bearings to be lubricated, from where it will be conducted to the bearings through small pipes, these bearings being in that case constructed similar to the bearings represented in Fig. 2, with the exception that the trickling oil from the same will be conducted through the pipe *b* to the centrifugal cup placed on that shaft.

I am aware that a curved oil-cup has been attached to the hub of a pulley so as to revolve with it, force the oil against the shaft; and this I disclaim.

Having thus described my invention, I claim—

1. In combination with the shaft A and stationary bearings B, a revolving oil or grease cup, D, that is secured to the said shaft, and made to revolve around the end of the bearing, substantially as and for the purpose specified.

2. The combination of a bearing or pulley, an oil or grease cup that revolves around said bearing, or with the pulley, and a pipe for gathering the oil or grease from the inside of the cup, and forcing it into the bearing, as specified.

3. In combination with a bearing, a revolving cup that is attached to the shaft, a pipe for forcing the oil through the bearing, and a stationary oil or grease box that is attached to or formed with the bearing, substantially as set forth.

4. The chambers *d*, channel-way *m*, and pipe *b* in the shaft-bearing, in combination with a centrifugal cup, D, fast to the revolving shaft, and pipe J, fast to the upper part of the shaft-bearing, and connected with the lubricating-cup *c*, substantially as described.

5. The chambers H in the loose pulley P, closed by suitable cups D, in combination with pipes V W, attached to the shaft, and connected through suitable holes or channelways with a groove, *s*, or with the internal bearing of said pulley, and operating in the manner and for the purpose set forth.

In testimony that I claim the foregoing I have hereunto set my hand this 8th day of October, 1875.

JOHANNES AUGUST OSENBRÜCK.

Witnesses:

ADOLF OSENBRÜCK,

WILH. OSENBRÜCK.